United States Patent Office 3,635,874
Patented Jan. 18, 1972

3,635,874
FLAME RESISTANT SILICONE COMPOSITIONS CONTAINING FUME TITANIUM DIOXIDE
Thomas L. Laur, Sanford, and Peter Lamont, Midland, Mich., assignors to Dow Corning Corporation, Midland, Mich.
No Drawing. Continuation-in-part of application Ser. No. 842,353, July 16, 1969. This application Apr. 20, 1970, Ser. No. 30,308
Int. Cl. C08g 51/04
U.S. Cl. 260—37 SB       36 Claims

ABSTRACT OF THE DISCLOSURE

A flame resistant silicone composition having improved flame resistance cures to a flame resistant silicone product, such as an elastomer. The silicone composition contains 100 parts by weight of a silicone polymer free of silicon bonded hydrogen atoms, 0 to 100 parts by weight of a reinforcing silica filler, 10 to 150 parts per million parts by weight based on the weight of the silicone polymer of platinum and 0.5 to 100 parts by weight of fume titanium dioxide having an average particle size of less than 0.10 micron. Additional flame resistant properties in the silicone compositions are observed by the addition of 0.05 to 2 parts by weight sulfur free carbon black to the silicone composition described above.

---

This application is a continuation-in-part of application Ser. No. 842,353, filed July 16, 1969.

This invention relates to an improved flame resistant silicone composition.

Flame resistant materials are always desirable and the search for these materials is a continuous process. Because fires are so destructive, people desire to protect themselves and their property by using materials which are flame resistant. Electrical devices are often the cause of fires and it is therefore important to provide electrical devices with as much protection as possible. Furthermore, it is important that electrical devices and wiring remain operative even after being exposed to flames, particularly in aircraft or ships where failure could cause disaster. For this reason flame resistant insulation is highly desirable.

An object of the present invention is to provide a silicone composition which has improved flame resistance over the flame resistant silicone composition containing the flame resistant additive platinum. Other objects and advantages will become apparent from the following detailed description.

It is known in the silicone rubber art that titanium dioxide can be added to silicone rubber as a pigment, however, it was completely unexpected that certain specifically prepared titanium dioxides of certain particle sizes would significantly improve the flame resistance of a silicone composition when used with platinum.

The present invention relates to a flame resistant silicone composition consisting essentially of (A) 100 parts by weight of a polydiorganosiloxane gum wherein each organic radical is selected from a group consisting of a methyl radical, a vinyl radical, a 3,3,3-trifluoropropyl radical and a phenyl radical, there being from 0 to 2 inclusive percent vinyl radicals based on the total number of organic radicals in the polydiorganosiloxane gum, there being from 0 to 50 inclusive percent 3,3,3-trifluoropropyl radicals based on the total number of organic radicals in the polydiorganosiloxane gum, there being from 0 to 10 inclusive percent of phenyl radicals based on the total number of organic radicals in the polydiorganosiloxane gum, there being from 1.98 to 2.002 inclusive organic radicals per silicon atom in the polydiorganosiloxane gum, (B) from 0 to 100 inclusive parts by weight of a reinforcing silica filler, (C) from 0.1 to 10 inclusive parts by weight of an organic peroxide, (D) from 10 to 150 inclusive parts by weight platinum per million parts by weight polydiorganosiloxane gum, said platinum being in the form of a platinum containing material in an unsupported form, and (E) from 0.5 to 100 inclusive parts by weight of fume titanium dioxide, said fume titanium dioxide having an average particle diameter of less than 0.10 micron, said flame resistant silicone composition being free of silicon bonded hydrogen atoms.

The silicone composition of the present invention can be a silicone elastomer stock. The silicone elastomer stocks of the present invention can be any conventional silicone elastomer stock based on a polydiorganosiloxane gum which contains methyl and vinyl, phenyl and/or 3,3,3-trifluoropropyl radicals bonded to the silicone atoms of the polydiorganosiloxane gum used therein. The polydiorganosiloxane gums are well known in the art and can be obtained commercially. Examples of polydiorganosiloxane gums are those polymers, copolymers and mixtures thereof wherein the repeating units are represented by dimethylsiloxane, phenylmethylsiloxane, 3,3,3-trifluoropropylmethylsiloxane, diphenylsiloxane, methylvinylsiloxane and phenylvinylsiloxane units. The polydiorganosiloxane gums can contain vinyl radicals up to 2 percent of the total number of organic radicals, preferably up to 1 percent, 3,3,3-trifluoropropyl radicals up to 50 percent of the total number of organic radicals, preferably up to 10 percent, and phenyl radicals up to 10 percent of the total number of organic radicals, preferably up to 5 percent. The polydiorganosiloxane gums can have an average of 1.98 to 2.002 silicon bonded organic radicals per silicon atom. The terminating units can be triorganosiloxy units, hydroxyl groups or alkoxy groups. The triorganosiloxy units can be illustrated by trimethylsiloxy, dimethylvinylsiloxy, methylphenylvinylsiloxy, methyldiphenylsiloxy, 3,3,3-trifluoropropyldimethylsiloxy and the like.

The silicone elastomer stocks of the present invention can contain any of the conventional reinforcing silica fillers. These reinforcing silica fillers are well known in the art and can be obtained commercially. The reinforcing silica fillers can be untreated, treated or treated in situ. The treated reinforcing silica fillers can be treated by any of the conventional methods described in the prior art, wherein the treating agents include, organosilanes, organosiloxane, and silazanes. The amount of reinforcing silica filler can be from 0 to 100 parts by weight per 100 parts by weight of the polydiorganosiloxane gum, at least 10 parts by weight for best results and preferably from 20 to 60 parts by weight reinforcing silica filler.

The organic peroxide can be any of the conventional organic peroxides used to vulcanize silicone rubber. Some illustrative examples of organic peroxides include, bis(2,4-dichlorobenzoyl) peroxide, benzoyl peroxide, dicumyl peroxide, paradichlorobenzoyl peroxide, tertiary butyl perbenzoate, 2,5-bis(tertiary butyl peroxy)-2,5-dimethylhexane, and ditertiary butyl peroxide. The organic peroxides can be present in amounts of from 0.1 to 10 parts by weight per 100 parts by weight of the polydiorganosiloxane gum, preferably from 0.4 to 5 parts by weight.

The platinum is present in an amount of from 10 to 150 parts by weight per million parts by weight polydiorganosiloxane gum. The preferred amount of platinum is from 20 to 80 parts by weight per million parts by weight polydiorganosiloxane gum. The platinum can be added in any unsupported form that will permit essentially homogeneous dispersion. A supported form of platinum is platinum metal precipitated on a substrate such as silica, carbon or alumina. Therefore, platinum in an unsupported form is any platinum containing material which is not platinum metal precipitated on a substrate. Included in the platinum containing materials are the readily dispersible platinum compounds and complexes which are well known in the art. Illustrative of the readily dispersible platinum containing materials include, chloroplatinic acid, platinum chlorides, $PtCl_2[P(CH_2CH_2CH_3)_3]_2$, platinum bromides, a complex of platinus halide and an olefin such as ethylene, propylene, butylene, cyclohexane and styrene,

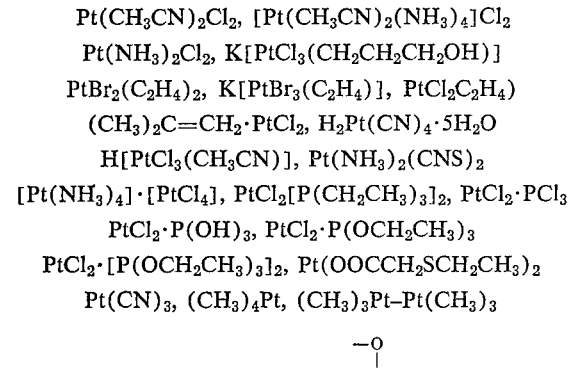

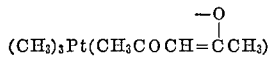

$PtCl_2CO$ and $PtBr_2CO$.

The platinum can be added to any of the silicone elastomer stocks, either during their formulation or to a stock already formulated. The platinum should be thoroughly mixed to form a homogeneous mixture. Conventional formulating techniques can be used, such as milling. For better and faster dispersion of the platinum, organic solvents can be used. Organic solvents ordinarily used in preparing silicone elastomer stocks are suitable, such as isopropanol, ethanol, benzene, toluene and xylene.

The key ingredient of the present invention is the fumed titanium dioxide having an average particle size of less than 0.10 micron in diameter. Fumed titanium dioxide is commercially prepared by flame hydrolysis of titanium tetrachloride. The fumed titanium dioxide for purposes of this invention must have an average particle size of less than 0.10 micron in diameter. The flame resistant properties of the flame resistant silicone compositions of the present invention are not obtained when a titanium dioxide with a larger particle diameter than 0.10 micron is used or the titanium dioxide is other than fumed titanium dioxide.

The fume titanium dioxide is added to the silicone elastomer stock in amounts of from 0.5 to 100 parts by weight per 100 parts by weight of the polydiorganosiloxane gum, preferably the fume titanium dioxide is added in amounts of from 2 to 25 parts by weight per 100 parts by weight of the polydiorganosiloxane gum.

The fume titanium dioxide is added to the silicone composition and mixed therewith in any conventional manner which is used in the preparation of silicone elastomer stocks having fillers. The best means of mixing the fume titanium dioxide is to mill it with the base silicone polymer at the time the filler is added. The method of mixing and order of addition, however, are not critical and any suitable method for obtaining a homogeneous mixture can be used.

The flame resistant silicone compositions of the present invention can include other fillers such as finely divided quartz, clays, calcium carbonate, diatomaceous earth, titanium dioxide, iron oxide and others which are conventionally used in silicone elastomers. Other additives such as heat stability additives, antioxidants, processing aids and other additives conventionally used in silicone elastomers can be used in the flame resistant silicone elastomer stock of this invention. Those skilled in the art of silicone rubber wanting to include some of the conventional ingredients other than those specifically stated in the composition should determine the flame resistance of the stock by the test described herein. Some ingredients may be sufficiently combustible to destroy the flame resistant property or they may be catalytic in nature and promote combustion, thereby destroying the flame resistant property.

The flame resistant silicone compositions of the present invention can be silicone elastomers containing silicone resins, particularly block copolymeric resins as described in U.S. Pat. No. 3,360,496 which is hereby incorporated by reference. The block copolymeric silicone resins contain blocks of siloxane units of the formula

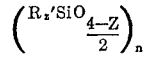

in which $n$ has an average value of from 6 to 100 inclusive, $z$ has an average value from 1.9 to 2 inclusive, and R' is selected from the group consisting of methyl and phenyl radicals, there being no more than 10 mol percent phenylsiloxane in said block

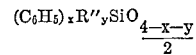

and blocks of the formula

in which $x$ has a value from 0.9 to 1.2 inclusive, R'' is a lower alkyl radical and $y$ has a value from 0 to 0.1 inclusive, the prime mol ratio of

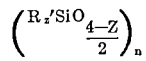

blocks and

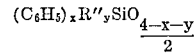

blocks being from 30:70 to 60:40 and the block copolymeric silicone resin having a melting point of at least 50° C. and having overall from 1.3 to 1.65 total hydrocarbon groups per silicon atom. The block copolymeric silicone resins are added to a silicone elastomer stock to provide from 10 to 65 weight percent based on the polydiorganosiloxane gum. Silicone elastomers containing the block copolymeric silicone resins are heat shrinkable. These silicone elastomers can be vulcanized, then heated and elongated and in the elongated state quenched in cold water. The quenched silicone elastomer retains the elongated configuration, but when heated again will shrink to its original dimensions.

Other flame resistant silicone compositions include mixtures of the polydiorganosiloxane gum, a benzene soluble resin copolymer of $SiO_2$ units and $R_3'''SiO_{0.5}$ units where R''' is an alkyl radical of less than 4 carbon atoms, a phenyl radical or a 3,3,3-trifluoropropyl radical, and where the ratio of $R_3'''SiO_{0.5}$ to $SiO_2$ units is from 0.6:1 to 0.9:1 inclusive. These benzene soluble copolymers are known in the art and can be prepared as described in U.S. Pat. No. 3,122,520 and U.S. Pat. No. 3,328,349, both of which are hereby incorporated by reference. These silicone compositions are useful as pressure-sensitive adhesives and the benzene soluble resin is present in an amount of from 5 to 235 parts by weight per 100 parts of polydiorganosiloxane gum. These silicone compositions can be used in the form of organic solvent solutions such as the hydrocarbon solvents such as, benzene, xylene, toluene and petroleum solvents or admixtures of these with other solvents such as alcohols, like isopropanol.

The foregoing heat shrinkable silicone elastomer and the pressure-sensitive adhesive illustrate the variety of silicone compositions of different uses which are flame resistant and within the scope of the present invention. These silicone compositions are flame resistant when they are cured, such as with the peroxides described above, and contain the platinum and fume titanium dioxide as described herein. The silicone elastomer, for example, can be foamed or sponged and still retain its flame resistant properties.

The flame resistant composition of the present invention provides a much improved flame resistant silicone composition. The prior art flame resistant silicone elastomers for example, are more flame resistant than the same silicone elastomers without the flame resistant, additives, but they fail to pass severe flame tests and also fail under use conditions which require a highly flame resistant material.

The flame resistant silicone compositions of the present invention can be cured by heating the stocks to produce silicone elastomers or pressure-sensitive adhesives for example, which are flame resistant and which have useful elastomeric and adhesive properties. It has been found that the flame resistance of a cured silicone elastomer is dependent upon the moisture content of the cured silicone elastomer. The flame resistance of cured silicone elastomer decreases with increasing moisture content. Thus, whereas a silicone rubber may be flame resistant at 0% moisture, it may not be flame resistant after being exposed to 50%, 60% or 100% relative humidity, whereby the moisture content of the silicone rubber is increased. The explanation for this phenomenon is not known to the inventor, however, the present invention overcomes this dependency of the flame resistance upon the moisture content of the silicone rubber. The use of platinum alone as a flame retardant additive will not provide a flame resistant silicone elastomer at all moisture contents.

The unique combination of ingredients of the present invention provides a flame resistant silicone composition, such as a silicone elastomer which has improved flame resistance over the use of platinum alone and also provides a flame resistant silicone elastomer which does not lose much of its flame resistance when the moisture content is increased.

The flame resistance of the flame resitant silicone composition can be further improved by the addition of from 0.05 to 2 parts by weight of carbon black being essentially free of sulfur per 100 parts by weight of the polydiorganosiloxane gum (A). Preferably, the carbon black is present in an amount of 0.1 to 0.8 part by weight per 100 parts by weight of the polydiorganosiloxane gum (A).

Any of the carbon blacks known in the art which are essentially free of sulfur can be used in the flame resistant silicone compositions of the present invention. By essentially free of sulfur it is to be understood that a carbon black can contain small amounts of sulfur but the content is significantly small that no effect on the flame resistant property is observed. The preferred carbon blacks are free of sulfur.

The flame resistant silicone elastomer containing platinum, fume titanium dioxide and carbon black are even less effected by moisture content than the flame resistant silicone elastomers containing platinum and fume titanium dioxide. The flame resistant silicone elastomer containing the carbon black will be a gray or black elastomer. In many applications, the color of the final product, such as the elastomer is not important, however, since this invention also includes a flame resistant silicone composition, without the carbon black, which can be pigmented any color, the problem of preparing certain colors is overcome and any color flame resistant silicone product can be made.

The following examples are illustrative only and should not be construed as limiting the present invention which is properly delineated in the appended claims.

EXAMPLE 1

A silicone elastomer stock was prepared by milling a mixture of 100.0 parts by weight of a polydiorganosiloxane gum having 99.91 percent methyl radicals and 0.09 percent vinyl radicals, 51.0 parts by weight treated reinforcing silica filler, 3.0 parts by weight of a polydiorganosiloxane fluid having 80 mol percent dimethylsiloxane units and 20 mol percent methylvinylsiloxane units, 2.31 parts by weight of a heat stability additive and 1.232 parts by weight of 2,4-dichlorobenzoyl peroxide. The silicone elastomer stocks were modified by additions of varying amounts of platinum added as a 1.0 weight percent solution of chloroplatinic acid in isopropanol, fume titanium dioxide having an average particle diameter of 0.03 micron and pigment grade titanium dioxide having an average particle diameter of 0.2 micron, as indicated in Table I. The amounts in Table I were based on 100 parts by weight of the polydiorganosiloxane gum. The silicone elastomer stocks were vulcanized by press molding for 5 minutes at 116° C. and then post cured for 4 hours at 200° C. Each cured sample was tested for flame resistance by exposing a 0.075 inch thick test specimen to an open yellow flame 1.5 inches in height from a ⅜ inch I.D. Bunsen burner. The end of the test specimen was held 0.75 inch from the top of the burner for a period of 12 seconds. The test specimen was then removed and the burn time was observed. The burn time was recorded as the length of time, in seconds, between the removal of the test specimen from the flame to the last evidence of flame and glow of the test specimen. The char length was measured and recorded in inches.

TABLE I

| Test specimen No. | Platinum, p.p.m. | Fume TiO$_2$, parts by weight | Pigment TiO$_2$, parts by weight | Burn time, seconds | Char length, inches |
|---|---|---|---|---|---|
| 1[1] | 0 | 0 | 0 | >120 | ([2]) |
| 2[1] | 0 | 15.75 | 0 | >120 | ([2]) |
| 3[1] | 37.8 | 0 | 0 | 15.2 | 0.0625 |
| 4[1] | 37.8 | 0 | 15.75 | 6.9 | 0.0625 |
| 5 | 37.8 | 0.79 | 0 | 5.6 | 0.0625 |
| 6 | 37.8 | 7.88 | 0 | 3.6 | 0.03125 |
| 7 | 37.8 | 15.75 | 0 | 0 | 0.03125 |
| 8 | 37.8 | 23.62 | 0 | 0 | 0.03125 |

[1] For comparative purposes.
[2] Totally consumed.

Test specimens of the cured silicone elastomers were also prepared in 6 inches by 0.5 inch by 0.075 inch sizes and subjected to a more severe flame test. The test specimens were exposed to a 1.5 inch soft blue flame while suspended in a 2 inch I.D. glass tube at a distance of 0.75 inch from the top of the burner. The exposure time was 20 seconds. The burn time was determined as described above and the weight percent consumed was recorded. The results are shown in Table II.

TABLE II

| Test specimen No. | Platinum, p.p.m. | Fume TiO$_2$, parts by weight | Pigment TiO$_2$, parts by weight | Burn time, seconds | Weight percent consumed |
|---|---|---|---|---|---|
| 1[1] | 0 | 0 | 0 | >120 | 100.0 |
| 2[1] | 0 | 15.75 | 0 | >120 | 100.0 |
| 3[1] | 37.8 | 0 | 0 | >120 | 100.0 |
| 4[1] | 37.8 | 0 | 15.75 | 47 | 12.0 |
| 5 | 37.8 | 7.88 | 0 | 20.9 | 3.8 |
| 6 | 37.8 | 15.75 | 0 | 5.9 | 2.1 |
| 7 | 37.8 | 23.62 | 0 | 2.5 | 1.7 |

[1] For comparative purposes.

The flame resistance of the silicone elastomers containing a combination of fume titanium dioxide with a particle diameter of less than 0.10 micron and platinum was much improved over the use of platinum alone, as well as, when a combination of platinum and pigment grade titanium dioxide was used.

EXAMPLE 2

A silicone elastomer stock was prepared by milling a mixture of 100 parts by weight of a polydiorganosiloxane gum having 98.876 percent methyl radicals, 0.359 percent vinyl radicals and 0.765 percent phenyl radicals, 50.46 parts by weight of a treated reinforcing silica filler, 2.03 parts by weight of heat stability additive, 7.64 parts by weight of 5 micron quartz, 43.5 parts by weight platinum per million parts by weight polydiorganosiloxane gum, and 1.222 parts by weight of 2,4-dichlorobenzoylperoxide. Fume titanium dioxide and pigment grade titanium as described in Example 1 were added in amounts as indicated in Table III. The silicone elastomer stocks were press molded 5 minutes at 116° C. and then post cured for 4 hours at 163° C. The test specimens were prepared, conditioned at various humidities, as indicated in Table III, for 90 hours and then the 12 second flame test as defined in Example 1 was used to determine the flame resistance in terms of burn time and char length. The results are shown in Table III.

TABLE III

| Test specimen No. | Fumed TiO₂, parts by weight | Pigment TiO₂, parts by weight | Humidity, percent | Burn time, seconds | Char length, inches |
|---|---|---|---|---|---|
| 1¹ | 0 | 0 | 0 | 29.0 | 0.3125 |
| 2¹ | 0 | 7.64 | 0 | 6.6 | 0.03125 |
| 3 | 7.64 | 0 | 0 | 1.3 | 0.03125 |
| 4¹ | 0 | 0 | 50 | 12.9 | 0.0625 |
| 5¹ | 0 | 7.64 | 50 | 6.9 | 0.0625 |
| 6 | 7.64 | 0 | 50 | 4.3 | 0.0625 |
| 7¹ | 0 | 0 | 100 | 78.3 | 1.0 |
| 8¹ | 0 | 7.64 | 100 | 83.0 | 1.0 |
| 9 | 7.64 | 0 | 100 | 2.6 | 0.0625 |

¹ For comparative purposes.

EXAMPLE 3

Silicone elastomer stocks were prepared as described in Example 2 except for the amount and type of peroxide used. This example showed that improved flame resistance was obtained regardless of the type of peroxide used to cure the silicone elastomer stock when a combination of platinum and fumed titanium dioxide was used. Each test specimen was obtained by press molding according to the following schedule.

TABLE IV

| Peroxide | Time, minutes | Temperature, ° C. |
|---|---|---|
| 2,4-dichlorobenzoyl peroxide | 5 | 116 |
| Benzoyl peroxide | 5 | 127 |
| 2,5-bis(tertiary butyl peroxy)-2,5-dimethylhexane | 10 | 171 |
| Dicumyl peroxide | 10 | 150 |
| Tertiary butyl perbenzoate | 10 | 150 |

All the specimens were post cured for 4 hours at 163° C. The 12 second flame test described in Example 1 was used to determine the flame resistance. The burn time and char length were recorded and are shown in Table V. The test specimens tested at 0 percent humidity were flame tested immediately upon removal from the post cure oven. The test specimens tested at 50 percent humidity were flame tested after conditioning at 50 percent humidity for 24 hours.

TABLE V

| Test Specimen No. | Peroxide catalyst | Amount peroxide, parts by weight | Fumed TiO₂ parts by weight | Humidity, percent | Burn time, seconds | Char length inches |
|---|---|---|---|---|---|---|
| 1¹ | 2,4-dichlorobenzoyl peroxide | 1.22 | 0 | 0 | 12 | 0.9625 |
| 2¹ | Benzoyl peroxide | 0.69 | 0 | 0 | 63 | 0.625 |
| 3¹ | 2,5-bis(tert. butyl peroxy)-2,5-dimethylhexane | 0.46 | 0 | 0 | 99 | 1.375 |
| 4¹ | Dicumyl peroxide | 1.22 | 0 | 0 | 63 | 0.875 |
| 5¹ | 2,4-dichlorobenzoyl peroxide | 1.22 | 0 | 50 | 69 | 0.500 |
| 6¹ | Benzoyl peroxide | 0.69 | 0 | 50 | 98 | 1.125 |
| 7¹ | 2,5-bis(tert. butyl peroxy)-2,5-dimethylhexane | 0.46 | 0 | 50 | (²) | (³) |
| 8¹ | Dicumyl peroxide | 1.22 | 0 | 50 | 82 | 1.250 |
| 9 | 2,4-dichlorobenzoyl peroxide | 1.22 | 7.64 | 50 | 2.6 | 0.03125 |
| 10 | Benzoyl peroxide | 0.69 | 7.64 | 50 | 5.5 | 0.03125 |
| 11 | 2,5-bis(tert. butyl peroxy)-2,5-dimethylhexane | 0.46 | 7.64 | 50 | 15.5 | 0.03125 |
| 12 | Dicumyl peroxide | 1.22 | 7.64 | 50 | 7.0 | 0.03125 |
| 13 | Tertiary butyl perbenzoate | 0.92 | 7.64 | 50 | 8.5 | 0.03125 |

¹ For comparative purposes.
² Burned.
³ Totally consumed.

EXAMPLE 4

A silicone elastomer stock as described in Example 2 was prepared except that 1.22 parts by weight of dicumyl peroxide was used in place of the 2,4-dichlorobenzoyl peroxide. The 12 second flame test as described in Example 1 was performed on the test specimens which were press molded for 10 minutes at 150° C. and then post cured for 4 hours at 163° C. The test specimens were humidity conditioned as described in Example 3. The results in Table VI show that a combination of fumed titanium dioxide, platinum and carbon black have unexpected flame resistance over a combination of fumed titanium dioxide and platinum.

TABLE VI

| Test Specimen No. | Fumed TiO₂ parts by weight | Carbon black, parts by weight | Humidity, percent | Burn time, seconds | Char length, inches |
|---|---|---|---|---|---|
| 1 | 8.40 | 0 | 0 | 15.0 | 0.0625 |
| 2 | 7.64 | 0.76 | 0 | 0.0 | 0.03125 |
| 3 | 8.40 | 0 | 50 | 10.0 | 0.0625 |
| 4 | 7.64 | 0.76 | 50 | 0.0 | 0.03125 |

EXAMPLE 5

A silicone elastomer stock was prepared by milling a mixture of 100 parts by weight of the polydiorganosiloxane gum described in Example 2, 50.46 parts by weight treated reinforcing silica, 2.03 parts by weight of a heat stability additive, 15.27 parts by weight 5 micron quartz, 43.5 parts by weight platinum per million parts by weight polydiorganosiloxane gum added as a one weight percent solution of chloroplatinic acid in isopropanol, and 1,374 parts by weight 2,4-dichlorobenzoyl peroxide. Fumed titanium dioxide as described in Example 1 and carbon black free of sulfur were added to various test specimens as shown in Table VII. The silicone elastomer stocks were then press molded for 5 minutes at 116° C. and post cured for 4 hours at 163° C. The test specimens were then moisture conditioned as described in Table VII and then the 12 second flame test as described in Example 1 was carried out. The results of burn time and char length are shown in Table VII.

TABLE VII

| Test specimen No. | Fumed TiO₂, parts by weight | Carbon black, parts by weight | Moisture conditioning | Burn time, seconds | Char length, inches |
|---|---|---|---|---|---|
| 1 | 0 | 0 | 24 hrs. at 50% humidity | 38.1 | 0.250 |
| 2 | 0 | 1.07 | do | 1.6 | 0.03125 |
| 3 | 7.64 | 1.07 | do | 0.0 | 0.03125 |
| 4 | 0 | 0 | 0.5 hr. at 20 lbs. steam | 81.0 | 0.8125 |
| 5 | 0 | 1.07 | do | 1.0 | 0.03125 |
| 6 | 7.64 | 1.07 | do | 0.0 | 0.03125 |
| 7 | 0 | 1.07 | 0.5 hr. at 20 lbs. steam plus 16 hrs. at 50% humidity. | 4.6 | 0.03125 |
| 8 | 7.64 | 1.07 | do | 3.0 | 0.03125 |

EXAMPLE 6

A silicone elastomer stock which has heat shrink properties was prepared by milling a mixture of 100 parts by weight of a polydiorganosiloxane gum having 96.142 percent methyl radicals, 0.108 percent vinyl radicals, 3.735 percent 3,3,3-trifluoropropyl radicals and 0.015 percent phenyl radicals, 40.0 parts by weight of a reinforcing silica, 11.0 parts by weight of a hydroxyl endblocked polydimethylsiloxane fluid having an average of 11 silicon atoms per molecule, 63.9 parts by weight of a siloxane resin having 48 mol percent dimethylsiloxane units, 50 mol percent monophenylsiloxane units and 2 mol percent diphenylsiloxane units, 1.074 parts by weight of a heat stability additive, 0.86 part by weight carbon black, 1.074 parts by weight dicumyl peroxide and 1.074 parts by weight of 2,4-dichlorobenzoyl peroxide. Fumed titanium dioxide as described in Example 1 was added as shown in Table VIII. Platinum was also added as a one weight percent solution of chloroplatinic acid in isopropanol as shown in Table VIII. The test specimens were prepared by press molding for 5 minutes at 116° C. and then post cured for 4 hours at 163° C. The cured test specimens were then tested for flame resistance by the 12 second flame test described in Example 1. The results were determined as burn time and char length as shown in Table VIII.

TABLE VIII

| Test Specimen No. | Platinum, p.p.m. | Fumed TiO$_2$, parts by weight | Burn time, seconds | Char length, inches |
|---|---|---|---|---|
| 1 | 0 | 0 | (¹) | (²) |
| 2 | 43.0 | 0 | (¹) | (²) |
| 3 | 86.0 | 0 | (¹) | (²) |
| 4 | 51.6 | 10.7 | 47 | 0.3125 |
| 5 | 51.6 | 21.5 | 3.3 | 0.03125 |

¹ Burned.
² Totally consumed.

EXAMPLE 7

A silicone elastomer stock was prepared by milling a mixture of the polydiorganosiloxane gum of Example 1, 120 parts by weight of Whitetex clay, 10 parts by weight of a reinforcing silica aerogel, 1.0 part by weight of 2,4-dichlorobenzoyl peroxide. To a portion of the silicone elastomer stock 129 parts by weight platinum added as a one weight percent solution of chloroplatinic acid in isopropanol per million parts by weight polydiorganosiloxane gum was added. A test specimen was press molded for 5 minutes at 116° C. and then post cured for 4 hours at 163° C. In the 12 second flame test as described in Example 1, the test specimen burned and was totally consumed. To another portion of the silicone elastomer stock, 129 parts by weight platinum per million parts by weight of polydiorganosiloxane gum and 10 parts by weight fumed titanium dioxide as described in Example 1 was added. A test specimen was prepared by press molding for 5 minutes at 116° C. and post curing for 4 hours at 163° C. The 12 second flame test gave a burn time of 13.6 seconds and a char length of 0.125 inch.

EXAMPLE 8

When the following silicone elastomer stocks are prepared and cured, the test specimens show improved flame resistance as indicated by the burn time and char length observed from the 12 second flame test described in Example 1 as compared to the same composition without the fumed titanium dioxide. Parts are parts by weight.

(A)

100 parts of polydimethylsiloxane gum having 2.002 methyl radicals per silicon atom,
60 parts of a treated reinforcing silica,
10 parts of benzoyl peroxide,
10 parts per million of platinum in the form of PtCl$_2$·PCl$_3$, and
25 parts of fumed titanium dioxide having an average particle diameter of 0.09 micron.

(B)

100 parts of a polydiorganosiloxane gum having 1.98 organic radicals per silicon atom where the organic radicals are 89 percent methyl radicals, 1 percent vinyl radicals and 10 percent 3,3,3-trifluoropropyl radicals,
40 parts of a reinforcing silica,
1.0 part of 2,4-dichlorobenzoyl peroxide,
20.0 parts per million platinum in the form of PtCl$_2$·[P(OCH$_2$CH$_3$)$_3$]$_2$, and
100.0 parts of fumed titanium dioxide having an average particle diameter of 0.05 micron.

(C)

100 parts of a polydiorganosiloxane gum having 93 percent methyl radicals, 5 percent phenyl radicals and 2 percent vinyl radicals and 2.001 organic radicals per silicon atom,
100 parts of a treated reinforcing silica filler,
2 parts dicumyl peroxide,
0.5 part of fumed titanium dioxide having an average particle diameter of 0.02 micron, and
150 parts per million of platinum in the form of PtBr$_2$(C$_2$H$_4$)$_2$.

(D)

100 parts of a polydiorganosiloxane gum having 89.5 percent methyl radicals, 0.5 percent vinyl radicals and 10 percent phenyl radicals and hydroxyl endblocked,
50 parts of a reinforcing silica filler,
60 parts per million of platinum in the form of H$_2$Pt(CN)$_4$·5H$_2$O,
5 parts of fumed titanium dioxide having an average particle diameter of 0.04 micron, and
0.1 part of 2,5-bis(tertiary butyl peroxy)-2,5-diamethylhexane.

EXAMPLE 9

When the following silicone elastomer stocks are prepared and cured, the test specimens show improved flame resistance as indicated by the burn time and char length observed from the 12 second flame test described in Example 1 and tested after exposure to 50 percent relative humidity for 24 hours as compared to the same composition without the sulfur free carbon black. Parts are parts by weight.

(A)

100 parts of polydimethylsiloxane gum having 2.002 methyl radicals per silicon atom,
60 parts of a treated reinforcing silica filler,
10 parts of benzoyl peroxide,
10 parts per million of platinum in the form of

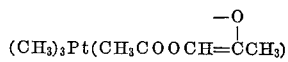

25 parts of fumed titanium dioxide having an average particle diameter of 0.03 micron, and
1 part carbon black.

(B)

100 parts of a polydiorganosiloxane gum having 93 percent phenyl radicals and 2 percent vinyl radicals and 2.001 organic radicals per silicon atom,
45 parts of a reinforcing silicon filler,
2 parts dicumyl peroxide,
5 parts fumed titanium dioxide having an average particle diameter of 0.04 micron,
75 parts per million of platinum in the form of chloroplatinic acid, and
2 parts of carbon black.

(C)

100 parts of a polydiorganosiloxane gum having 89.5 percent methyl radicals, 0.5 percent vinyl radicals and 10 percent phenyl radicals and hydroxyl endblocked,
50 parts of a reinforcing silica filler,
60 parts per million of platinum in the form of K[PtCl₃(CH₂CH₂CH₂OH)]
5 parts of fumed titanium dioxide having an average particle diameter of 0.095 micron,
0.1 part of 2,5-bis(tertiary butyl peroxy)-2,5-dimethylhexane, and
0.05 part of carbon black.

EXAMPLE 10

A silicone elastomer stock was prepared by milling a mixture of 100 parts by weight of a poly-3,3,3-trifluoropropylmethylsiloxane gum containing about 0.5 mol percent methylvinylsiloxane units, 57 parts by weight of a treated reinforcing silica filler, 3 parts by weight of a polydiorganosiloxane fluid having 80 mol percent dimethylsiloxane units and 20 mol percent methylvinylsiloxane units, 2 parts by weight of a heat stability additive, 8.1 parts by weight of 5 micron quartz, 8.1 parts by weight of the fume titanium dioxide as described in Example 1, 1.3 parts by weight of carbon black free of sulfur, 46.2 parts by weight platinum per million parts by weight of gum, the platinum being in the form of chloroplatinic acid and 1.0 part by weight of 2,5-bis(tertiary-butylperoxy)-2,5-dimethylhexane. The silicon elastomer stocks were press molded in about 0.075 inch thick moldings for 10 minutes at 171° C. and then post cured for 8 hours at 200° C. The three resulting test pieces were allowed to come to equilibrium for 7 days at 50% relative humidity at 22° C. The test pieces having 0.079, 0.080 and 0.083 inch thicknesses were tested as described in Example 1, except the test pieces were horizontally held in the flame and the exposure time was 15 seconds. Each test piece had a burn time of 0 second and a char length of 0.03125 inch.

The same silicone elastomer stock without the platinum, fume titanium dioxide and carbon black was completely consumed in the flame resistance test.

EXAMPLE 11

A pressure sensitive adhesive composition was prepared by milling a mixture 100 parts by weight of a hydroxyl endblocked polydimethylsiloxane gum, 112.7 parts by weight of a benzene soluble resin copolymer of trimethylsiloxane units and SiO₂ units in a mole ratio of 0.61 to 1.0 and having about one weight percent silicon-bonded hydroxyl radicals, 6.4 parts by weight of isopropanol, 106.3 parts by weight of xylene, 1.08 parts by weight of the reaction product of tetramethylguanidine and 2-ethylhexoic acid, 16.34 parts by weight of the fume titanium dioxide of Example 1, 24.49 parts by weight of a hydroxyl endblocked polydimethylsiloxane having a viscosity of 12,500 cs. at 25° C., 93.2 parts by weight of platinum per million parts by weight of gum, the platinum being in the form of chloroplatinic acid and two weight percent benzoyl peroxide based on the weight of the gum and resin. The pressure sensitive adhesive was coated on 4 mil glass cloth to provide a 4 mil thickness and was then cured for 15 minutes at 70° C. followed by 3 minutes at 177° C. The coated glass cloth had pressure sensitive adhesive tape properties. The coated cloth was tested for flame resistance by Federal Specification for Flame Resistant Cloth, CCC–T–191b, Method 5902, May 15, 1951, "Flame Resistance of Cloth; Vertical."

The test specimens, 3 inches by 10 inches, were clamped in a metal frame. The test specimens were ignited by a bunsen burner adjusted for a 1.5 inch yellow flame. The test specimens were held in a vertical position with the ignition flame applied for 15 seconds. The flame immediately extinguished itself upon removal of the ignition flame and the glow time was 2 to 3 seconds.

The pressure sensitive adhesive was prepared as described above except the fume titanium dioxide and platinum were left out. The test specimens were completely consumed when tested for flame resistance.

That which is claimed is:

1. A flame resistant silicone composition consisting essentially of (A) 100 parts by weight of a polydiorganosiloxane gum wherein each organic radical is selected from a group consisting of a methyl radical, a vinyl radical, 3,3,3-trifluoropropyl radical and a phenyl radical, there being from 0 to 2 inclusive percent vinyl radicals based on the total number of organic radicals in the polydiorganosiloxane gum, there being from 0 to 50 inclusive percent 3,3,3-trifluoropropyl radicals based on the total number of organic radicals in the polydiorganosiloxane gum, there being from 0 to 10 inclusive percent of phenyl radicals based on the total number of organic radicals in the polydiorganosiloxane gum, there being from 1.98 to 2.002 inclusive organic radicals per silicon atom in the polydiorganosiloxane gum, (B) from 0 to 100 inclusive parts by weight of a reinforcing silica filler, (C) from 0.1 to 10 inclusive parts by weight of an organic peroxide, (D) from 10 to 150 inclusive parts by weight platinum per million parts by weight polydiorganosiloxane gum, said platinum being in the form of a platinum containing material in an unsupported form, and (E) from 0.5 to 100 inclusive parts by weight of fume titanium dioxide, said fume titanium dioxide having an average particle diameter of less than 0.10 micron, said flame resistant silicone composition being free of silicon-bonded hydrogen atoms.

2. A flame resistant silicone elastomer stock consisting essentially of (A) 100 parts by weight of a polydiorganosiloxane gum wherein each organic radical is selected from a group consisting of a methyl radical, a vinyl radical, a 3,3,3-trifluoropropyl radical and a phenyl radical, there being from 0 to 2 inclusive percent vinyl radicals based on the total number of organic radicals in the polydiorganosiloxane gum, there being from 0 to 10 inclusive percent 3,3,3-trifluoropropyl radicals based on the total number of organic radicals in the polydiorganosiloxane gum, there being from 0 to 10 inclusive percent of phenyl radicals based on the total number of organic radicals in the polydiorganosiloxane gum, there being from 1.98 to 2.002 inclusive organic radicals per silicon atom in the polydiorganosiloxane gum, (B) from 10 to 100 inclusive parts by weight of a reinforcing silica filler, (C) from 0.1 to 10 inclusive parts by weight of an organic peroxide, (D) from 10 to 150 inclusive parts by weight platinum per million parts by weight polydiorganosiloxane gum, said platinum being in the form of a platinum containing material in an unsupported form, and (E) from 0.5 to 100 inclusive parts by weight of fume titanium dioxide, said fume titanium dioxide having an average particle diameter of less than 0.10 micron, said flame resistant silicone elastomer stock being free of silicon-bonded hydrogen atoms.

3. The flame resistant silicone elastomer stock of claim 2 wherein the reinforcing silica filler (B) is present in an amount of from 20 to 60 inclusive parts by weight, the organic peroxide (C) is present in an amount of from 0.4 to 5 inclusive parts by weight and the platinum (D) is present in an amount of from 20 to 80 inclusive parts by weight per million parts by weight of the polydiorganosiloxane gum.

4. The flame resistant silicone elastomer stock of claim 2 wherein the fumed titanium dioxide is present in an amount of from 2 to 25 inclusive parts by weight.

5. The flame resistant silicone elastomer stock of claim 3 wherein the fumed titanium dioxide is present in an amount of from 2 to 25 inclusive parts by weight.

6. The flame resistant silicone elastomer stock of claim 2 wherein the polydiorganosiloxane gum (A) is a polydimethylsiloxane gum having vinyl radicals in an amount of up to 1 percent.

7. The flame resistant silicone elastomer stock of claim 3 wherein the polydiorganosiloxane gum (A) is a polydimethylsiloxane gum having vinyl radicals in an amount of up to 1 percent.

8. The flame resistant silicone elastomer stock of claim 4 wherein the polydiorganosiloxane (A) is a polydimethylsiloxane gum having vinyl radicals in an amount of up to 1 percent.

9. The flame resistant silicone elastomer stock of claim 5 wherein the polydiorganosiloxane (A) is a polydimethylsiloxane gum having vinyl radicals in an amount of up to 1 percent.

10. The flame resistant silicone elastomer stock of claim 2 wherein there is also present from 0.05 to 2 inclusive parts by weight of carbon black being essentially free of sulfur per 100 parts by weight of polydiorganosiloxane gum.

11. The flame resistant silicone elastomer stock of claim 3 wherein there is also present from 0.05 to 2 inclusive parts by weight of carbon black being essentially free of sulfur per 100 parts by weight of polydiorganosiloxane gum.

12. The flame resistant silicone elastomer stock of claim 4 wherein there is also present from 0.05 to 2 inclusive parts by weight of carbon black being essentially free of sulfur per 100 parts by weight of polydiorganosiloxane gum.

13. The flame resistant silicone elastomer stock of claim 5 wherein there is also present from 0.05 to 2 inclusive parts by weight of carbon black being essentially free of sulfur per 100 parts by weight of polydiorganosiloxane gum.

14. The flame resistant silicone elastomer stock of claim 9 wherein there is also present from 0.05 to 2 inclusive parts by weight of carbon black being essentially free of sulfur per 100 parts by weight of polydiorganosiloxane gum.

15. The flame resistant silicone elastomer stock of claim 10 wherein the carbon black is present in an amount of from 0.1 to 0.8 parts by weight.

16. The flame resistant silicone elastomer stock of claim 11 wherein the carbon black is present in an amount of from 0.1 to 0.8 parts by weight.

17. The flame resistant silicone elastomer stock of claim 12 wherein the carbon black is present in an amount of from 0.1 to 0.8 parts by weight.

18. The flame resistant silicone elastomer stock of claim 14 wherein the carbon black is present in an amount of from 0.1 to 0.8 parts by weight.

19. The flame resistant silicone elastomer stock of claim 2 wherein the platinum is in the form of chloroplatinic acid.

20. The flame resistant silicone elastomer stock of claim 5 wherein the platinum is in the form of chloroplatinic acid.

21. The flame resistant silicone elastomer stock of claim 9 wherein the platinum is in the form of chloroplatinic acid.

22. The flame resistant silicone elastomer stock of claim 10 wherein the platinum is in the form of chloroplatinic acid.

23. The flame resistant silicone elastomer stock of claim 13 wherein the platinum is in the form of chloroplatinic acid.

24. The flame resistant silicone elastomer stock of claim 18 wherein the platinum is in the form of chloroplatinic acid.

25. A cured flame resistant silicone elastomer consisting of the flame resistant silicone elastomer stock of claim 2.

26. A cured flame resistant silicone elastomer consisting of the flame resistant silicone elastomer stock of claim 3.

27. A cured flame resistant silicone elastomer consisting of the flame resistant silicone elastomer stock of claim 5.

28. A cured flame resistant silicone elastomer consisting of the flame resistant silicone elastomer stock of claim 9.

29. A cured flame resistant silicone elastomer consisting of the flame resistant silicone elastomer stock of claim 10.

30. A cured flame resistant silicone elastomer consisting of the flame resistant silicone elastomer stock of claim 14.

31. A cured flame resistant silicone elastomer consisting of the flame resistant silicone elastomer stock of claim 18.

32. A cured flame resistant silicone elastomer consisting of the flame resistant silicone elastomer stock of claim 24.

33. The flame resistant silicone composition of claim 1 in which there is also present from 10 to 65 weight percent based on the combined weight of the polydiorganosiloxane gum and silicone resin of a block copolymeric silicone resin consisting essentially of blocks of siloxane units of the formula $$\left(\frac{R'_zSiO_{4-z}}{2}\right)_n$$

in which $n$ has an average value from 6 to 100 inclusive, $z$ has an average value from 1.9 to 2 inclusive, and R' is selected from the group consisting of methyl and phenyl radicals, there being no more than 10 mol percent phenylsiloxane in said block $$\left(\frac{R'_zSiO_{4-z}}{2}\right)_n$$

and blocks of the formula $$\frac{(C_6H_5)_xR''_ySiO_{4-x-y}}{2}$$

in which $x$ has a value from 0.9 to 1.2 inclusive, R'' is a lower alkyl radical and $y$ has a value from 0 to 0.1 inclusive, the prime mol ratio of $$\left(\frac{R_zSiO_{4-z}}{2}\right)_n$$

blocks and $$\frac{(C_6H_5)_xR''_ySiO_{4-x-y}}{2}$$

blocks being from 30:70 to 60:40 and the block copolymeric silicone resin having a melting point of at least 50° C. and having overall from 1.3 to 1.65 total hydrocarbon groups per silicon atom.

34. The flame resistant silicone composition of claim 33 wherein there is also present from 0.05 to 2 inclusive parts by weight of carbon black being essentially free of sulfur per 100 parts by weight of polydiorganosiloxane gum.

35. The flame resistant silicone composition of claim 1 in which there is also present from 5 to 235 parts by weight per 100 parts of (A) of a benzene soluble resin copolymer of $SiO_2$ units and $R'''_3SiO_{0.5}$ units where R''' is an alkyl radical of less than 4 carbon atoms, a phenyl radical or a 3,3,3-trifluoropropyl radical, and where the ratio of $R'''_3SiO_{0.5}$ units to $SiO_2$ units is from 0.6:1 to 0.9:1 inclusive and (B) is 0.

36. The flame resistant silicone composition of claim 35 in which there is also present from 0.05 to 2 inclusive parts by weight of carbon black being essentially free of sulfur per 100 parts by weight of polydiorganosiloxane gum.

(References on following page)

References Cited

UNITED STATES PATENTS

| | | | |
|---|---|---|---|
| 2,575,687 | 11/1951 | Simon et al. | 260—37 SB X |
| 3,062,621 | 11/1962 | Nelson et al. | 23—202 V |
| 3,453,232 | 7/1969 | Larson | 260—37 SB X |
| 3,514,424 | 5/1970 | Nobel et al. | 260—37 SB |

FOREIGN PATENTS 992,414  5/1965  Great Britain _____ 23—202 V

LEWIS T. JACOBS, Primary Examiner

U.S. Cl. X.R.

260—825, DIG 24